(12) United States Patent
Hu (10) Patent No.: US 6,240,472 B1
(45) Date of Patent: May 29, 2001

(54) METHOD AND SYSTEM FOR SHARING A COMMUNICATIONS PORT

(75) Inventor: George T. Hu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/176,779

(22) Filed: Oct. 22, 1998

(51) Int. Cl.$^7$ .............. G06F 13/12; G06F 13/38; G06F 3/00

(52) U.S. Cl. ............ 710/72; 710/2; 710/36; 710/72

(58) Field of Search .............. 710/1, 5, 15, 18, 710/64, 72, 2, 8, 36; 709/301

(56) References Cited

U.S. PATENT DOCUMENTS

| | | | |
|---|---|---|---|
| 5,544,315 | * 8/1996 | Lehfeldt et al. | 709/236 |
| 5,555,436 | * 9/1996 | Gavish | 710/1 |
| 5,754,881 | * 5/1998 | Aas | 710/2 |
| 5,828,899 | * 10/1998 | Richard et al. | 710/8 |
| 5,901,325 | * 5/1999 | Cox | 712/1 |
| 5,928,341 | * 7/1999 | Liang | 710/72 |
| 6,008,806 | * 12/1999 | Nakajima et al. | 345/335 |
| 6,064,566 | * 5/2000 | Agata et al. | 361/684 |
| 6,073,183 | * 6/2000 | Slonim | 709/310 |
| 6,172,676 | * 1/2001 | Wood | 345/346 |

FOREIGN PATENT DOCUMENTS

0860775A1 * 8/1998 (EP) ............... G06F/9/46

\* cited by examiner

Primary Examiner—Thomas Lee
Assistant Examiner—Chun Cao
(74) Attorney, Agent, or Firm—Michalik & Wylie, PLLC (57) ABSTRACT

A method and system for sharing a communications port by running a communications program that only occupies the communications port when a user action indicates that the communications port is needed. The communications port is released when it is determined that the user no longer needs it, however the communications program continues to run. The communications program is implemented in a shell extension that separates its functionality into two states, a resident state that is essentially available at all times but does not occupy the communications port, and an exclusive state that intelligently occupies the communications port when needed. When a user intuitively opens a folder related to device communication, the communications program enters the exclusive state, and returns to the resident state when the folder is closed, thereby freeing the communications port for use by other programs. While in the resident state, the user can connect for network communications while leaving the communications port available.

24 Claims, 5 Drawing Sheets

… (unable to transcribe full page within limit)

METHOD AND SYSTEM FOR SHARING A COMMUNICATIONS PORT

FIELD OF THE INVENTION

The invention relates generally to computer systems, and more particularly to communication between computer devices.

BACKGROUND OF THE INVENTION

Many computer devices including hand-held personal computers, palm-size personal computers, scanners, printers and digital cameras are configured to communicate with a desktop computer through a communications port. For example, each such device typically has a serial port which connects via a cable or infrared signals a counterpart port on the desktop computer. To exchange information with the desktop computer, each of these devices require that the desktop computer run a specific communications program corresponding to that device. Normally, the communications program occupies the communications port for the duration of its execution. At the same time, it is desirable that the communications program be running at all times so that the user may easily connect on demand and simply use the device, instead of having to locate the appropriate application, execute it, and then connect the device.

While this is adequate when the user has a single device, users with more than one device are unable to run multiple such programs simultaneously, since each tries to exclusively access the communications port at the same time. As a result, users of multiple devices heretofore have had to manually close the running communication program before running another communication program, or manually configure certain communications settings. Some programs, such as in association with a serial mouse, cannot easily be shut down. In short, the user cannot simply unplug one device, plug in another, and get the communications to work through intuitive user action on the computer.

SUMMARY OF THE INVENTION

Briefly, the present invention provides a method and system for dynamically sharing a communications port of a computer system by selectively occupying that port. A communications program is loaded and run, operating in a resident state that does not occupy the communications port. Upon detection of a user action related to a need to communicate through the communications port, such as opening a particular folder related to device communication, the communications program enters an exclusive state that exclusively occupies the communications port. Upon detection of a second user action related to no longer needing the communications port, such as closing the folder, the communications program re-enters the resident state and frees the communications port.

The method and system facilitate the sharing of a communications port by providing a communications program that intelligently occupies the communications port only when needed, and frees it when no longer needed, in response to intuitive user actions. A preferred communications program is implemented in a shell extension. While in the resident state, the user can connect for network communications while leaving the communications port available.

Other advantages will become apparent from the following detailed description when taken in conjunction with the drawings, in which:

DETAILED DESCRIPTION OF THE PREFERRED EMBODIMENT

Exemplary Operating Environment

Figure 1:
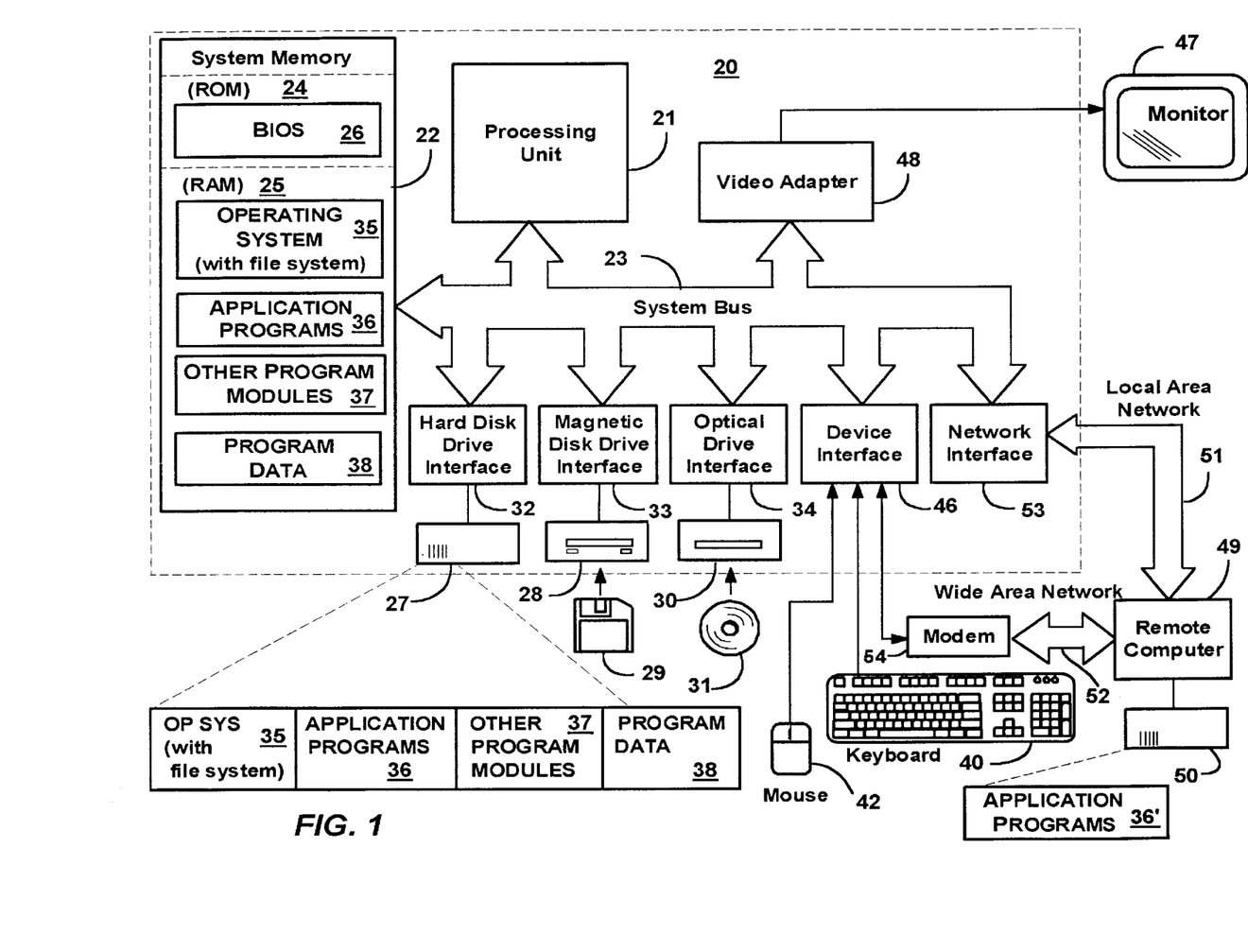
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a suitable device interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the interface 46. In a networked environment, program modules depicted relative to the personal computer 20, or portions thereof, may be stored in the remote memory storage device. It will be appreciated that the network connections shown are exemplary and other means of establishing a communications link between the computers may be used.

For purposes of the present invention, the computer system 20 may serve as a desktop computer 60 (FIG. 2) to which various other computing devices (e.g., devices 62, 64, 66, 68 and 70 of FIG. 2) connect to transfer information. However, as can be readily appreciated, the computer system 20 need not be a "desktop" computer, but instead may be any suitable computing device capable of exchanging information through a communications port.

Sharing a Communications Port

Figure 2:
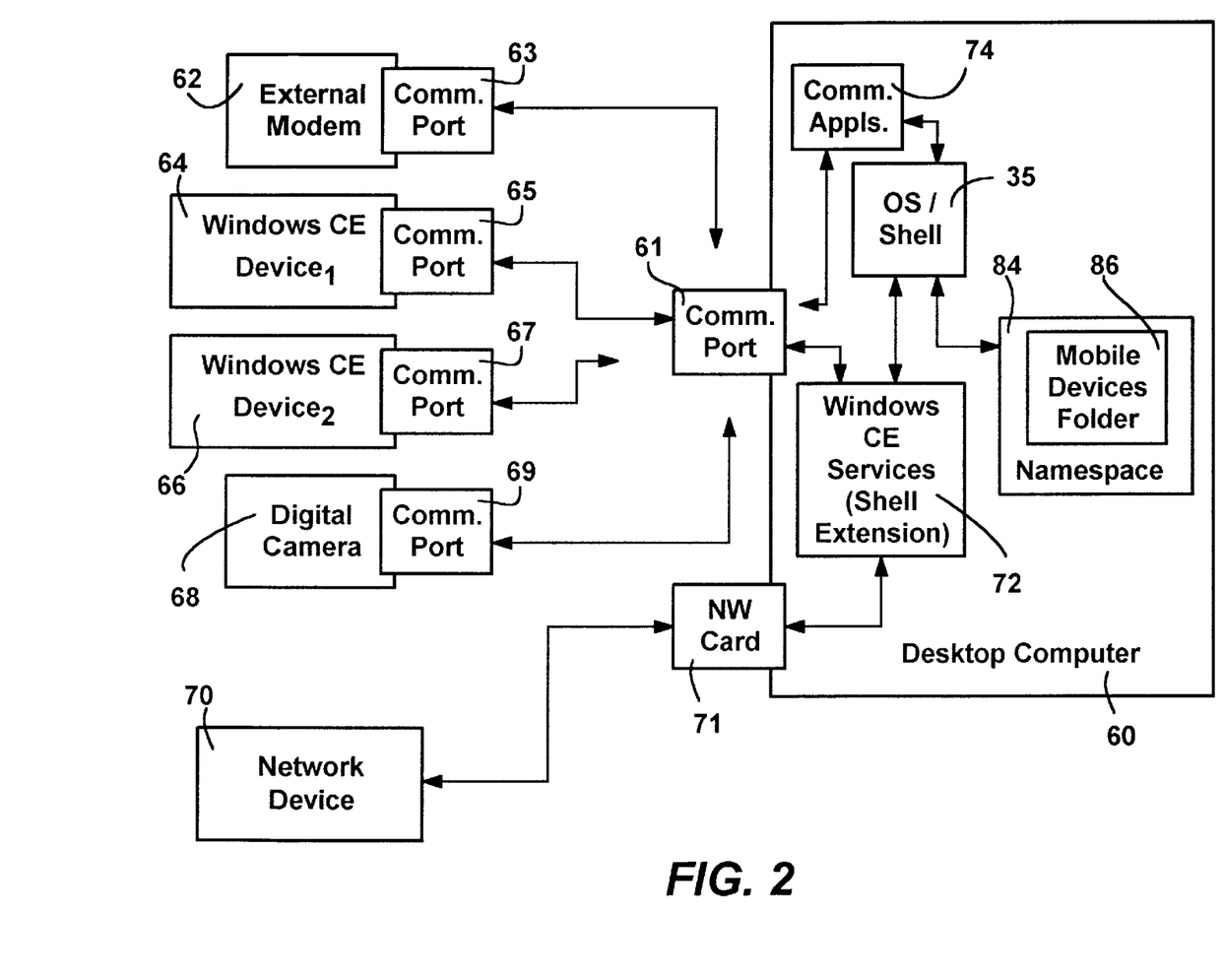
FIG. 2 is a block diagram representing a general architecture into which the present invention may be incorporated, including devices for connecting to a communications port of a desktop computer.
Figure 3:
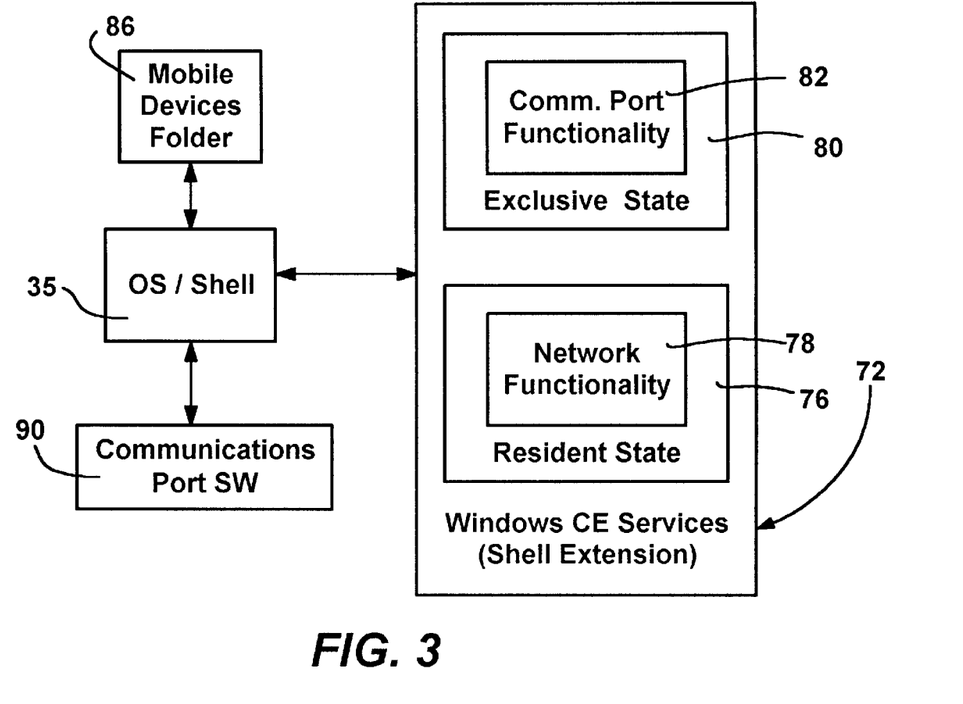
FIG. 3 is a block diagram representing various components for sharing a communications port in accordance with one aspect of the present invention.

FIGS. 2 and 3 generally illustrate an exemplary architecture and components therein for enabling the sharing of a communications port. While the present invention is originally implemented with Microsoft Windows® software, and will be described with reference thereto, it should be understood that the present invention may be implemented on many types of systems. In addition, although the present invention is primarily described with reference to serial communications ports, including those linked by wired or wireless (e.g., infrared) signals, the present invention is applicable to the dynamic switching of any communications links, including those used in network connections, modem connections, parallel connections and so forth. Moreover, although some of the various components are shown and described herein as combined components while others are separate components, it can be readily appreciated that some or all of the components may be combined into more complex components, and/or separated even further into additional components.

FIG. 2 shows a number of computing devices 62, 64, 66 and 68, each having at least one communication port, 63, 65, 67 and 69, respectively. Each of the devices is capable of connecting through their respective ports to a communications port 61 of the desktop computer 60. For example, the communications port 61 is typically a serial port, whereby only one of the external devices (e.g., 64) may connect to the desktop computer 60 therethrough at any one time. In addition, although not necessary to the present invention, a network device 70 may also be connected to the desktop computer 60 through an appropriate network card 71.

In a preferred embodiment, the present invention may be implemented within Microsoft® Corporation's Windows CE® Services 72. Windows CE® Services 72 is a program run on the desktop computer 60 (under the Microsoft® Windows® NT®, Windows® 95 or Windows® 98 operating systems) to communicate and exchange information with Windows® CE-based devices, such as the devices 64 and 66 in FIG. 2. Such devices 64 and 66 include hand-held or palm-sized personal computers running the Windows® CE operating system. When communicating, the Windows® CE Services 72 exclusively occupies the communications port 61, as will be described in detail below.

Although not necessary to the invention, Windows® CE Services 72 is preferably loaded and run as a shell extension, whereby it is automatically executed at system startup, (when the Windows® operating system boots), but does not have an open window shown in the desktop. When loaded, shell extensions are essentially integrated with the Windows Explorer shell. Shell extensions are well documented in the Microsoft Windows Software Developer's Kit, and are not described in detail herein for purposes of simplicity.

In addition to the CE Services shell extension 72, as shown in FIG. 2, other communication applications 74 may be present on the desktop computer 60. For example, the external modem device 62 and the digital camera device 68 shown in FIG. 2 typically each have counterpart software on the desktop computer 60 that occupies the communications port 61 when exchanging information with their respective device. However, in contrast to the present invention, (as described below), these types of applications are not intended to be run all the time, and exclusively occupy the communications port 61 while running.

In accordance with one aspect of the present invention, the CE Services shell extension 72 runs while the computer system 60 is running, and operates in one of two logical states. A first operating state is referred to herein as a "resident" state 76 (FIG. 3), and provides services such as network functionality 78, while not occupying the communications port. A second state, also represented in FIG. 3 and referred to herein as a "exclusive" state 80, provides communication port functionality 82 with Windows CE devices 6 or 66 while exclusively occupying the communications port 61. The CE services 72 automatically and intelligently switches to the exclusive state 80 (provided the communications port 61 is available) when it is deemed likely that the user needs the port 61 for Windows CE Services communication. When the user does not need the communications port 61 for CE Services, the CE Services shell extension 72 returns to the resident state 76, again allowing connections by other means such as the network card 71. Moreover, while the extension 72 is running in its resident state, another communication application 74 (FIG. 2) may occupy the communications port 61. The present invention, as embodied in the Windows CE services shell extension 72, is thus capable of running at all times, while providing communication through the communications port 61 when needed, yet does not exclusively occupy the port 61 at times when it is not needed.

Although no particular means of communicating is required, Windows CE Services 72 preferably communicates with the Windows CE devices 64, 66 via the Winsock application programming interface (API). Winsock provides a common API that is independent of protocol or physical link. Windows CE Services 72 may also communicate over a network connection, provided by the functions of Microsoft Windows® 95, Microsoft Windows® 98 or Microsoft Windows® NT®. Windows CE Services 72 communicates over a serial communications port by starting the Windows NT® Remote Access Server or Windows 95/98 Dial-Up Networking Server. Both of these physical links are then available through the Winsock API for use by Windows CE Services 72.

To intelligently determine when the user needs the communications port 61, the Windows® CE services shell extension 72 utilizes the user interface to detect when the user is browsing to communicate with a Windows® CE device, e.g., the device 64 of FIG. 2. To this end, when the user wishes to communicate with the device 64, the user simply and intuitively opens a device communications window as with a normal application. As described below, in this state, the open window will cause the communications port to be occupied. In this manner, unlike other applications, the user does not have to specifically ask to communicate.

More particularly, Windows® CE Services 72 adds to the "namespace" 84 of the Windows® shell 35 by placing a "Mobile Devices Folder" 86 into the hierarchical view of the computer 60. The Mobile Devices Folder 86 includes profiles of the Windows® CE devices 64 and 66. The operating system/shell 35 (Windows® Explorer) may then be used to browse into the Mobile Devices Folder 86. When the user is browsing into the Mobile Devices Folder 86, (i.e., the folder is open), Windows® CE Services 72 enters the exclusive state. In the exclusive state, the communications port 61 is occupied for communication with a Windows® CE device. When the user is not browsing into the Mobile Devices Folder 86, (i.e., the folder is closed), Windows® CE Services 72 is in the resident state. In the resident state, the communications port 61 is not being occupied by the Windows® CE Services 72, and a network device 70 can still connect to the desktop using a network connection (e.g., via the network card 71) and synchronize information. Note that the network connection is physically different from the serial communications port 61 used by most small computers and accessories, and it is straightforward to write software to use a network connection while not using the serial port 61.

Although not necessary to the present invention, Windows CE Services 72 optionally provides the implementation of the present invention as a feature referred to as "Auto Connect." The user may access this feature by opening the Mobile Devices Folder 86, choosing a "Communications" item of the "File" menu, and clicking on an "Auto Connect" button. Alternatively, the user may right click on an icon, (typically found in the lower right corner of the desktop screen depicting computers connected in various ways), select Communications, and click on a displayed "Auto Connect" button. To utilize the present invention, the user may choose an option, Auto Connect "Only while the Mobile Devices window is open." Another option will leave the program in the exclusive state, essentially operating the CE Services 72 as in the prior art by exclusively occupying the communications port 61 at all times while running. This other option may be useful, such as if the user does not have another need for the communications port 61.

Figure 4:
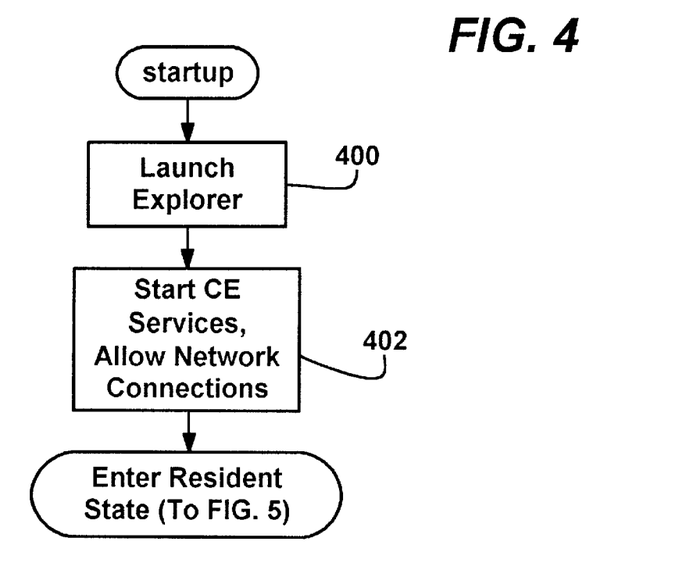
FIGS. 4–6 comprise a flow diagram generally representing steps taken to provide sharing of a communications port in accordance with one aspect of the present invention.
Figure 5:
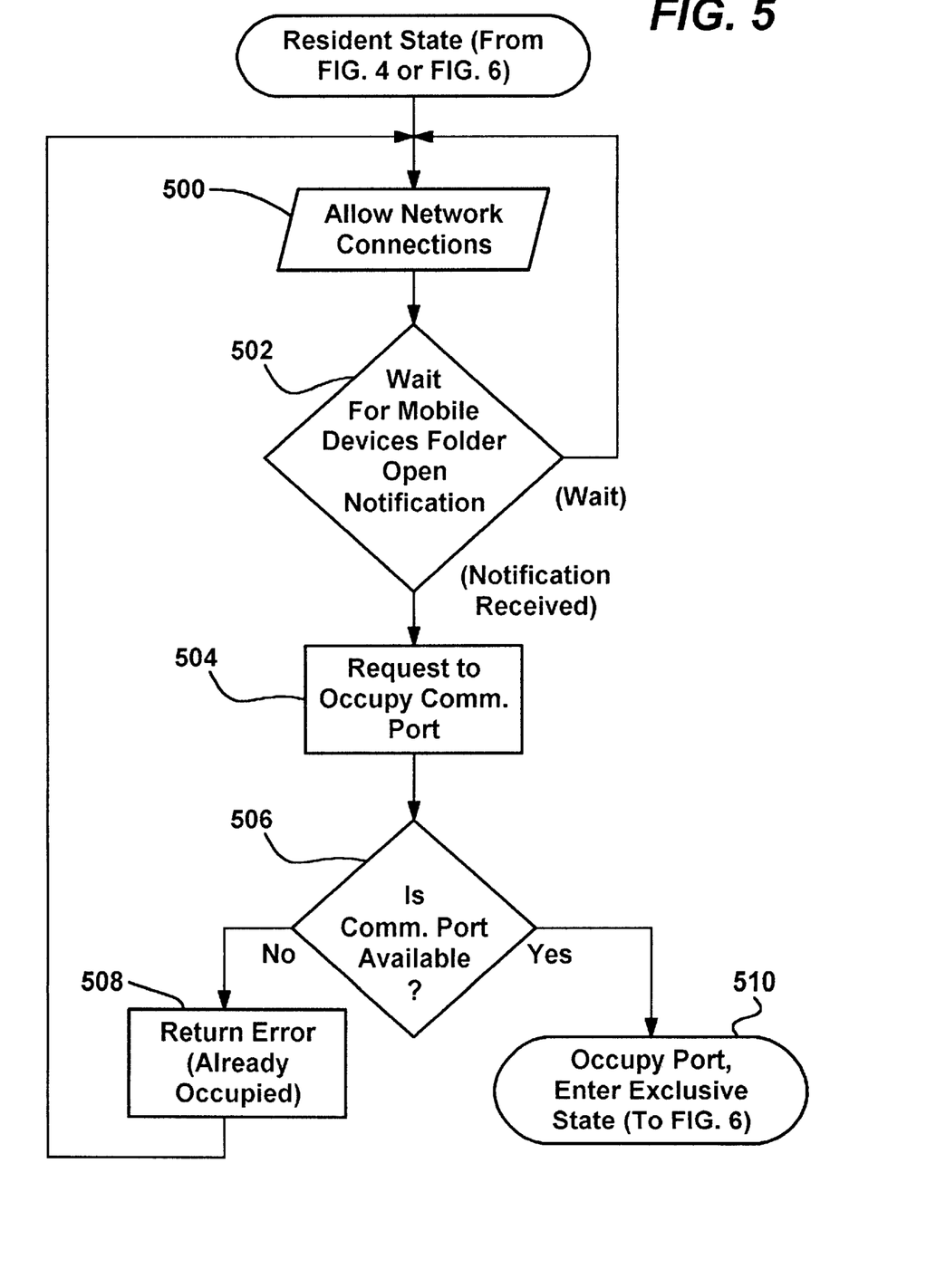
Figure 6:
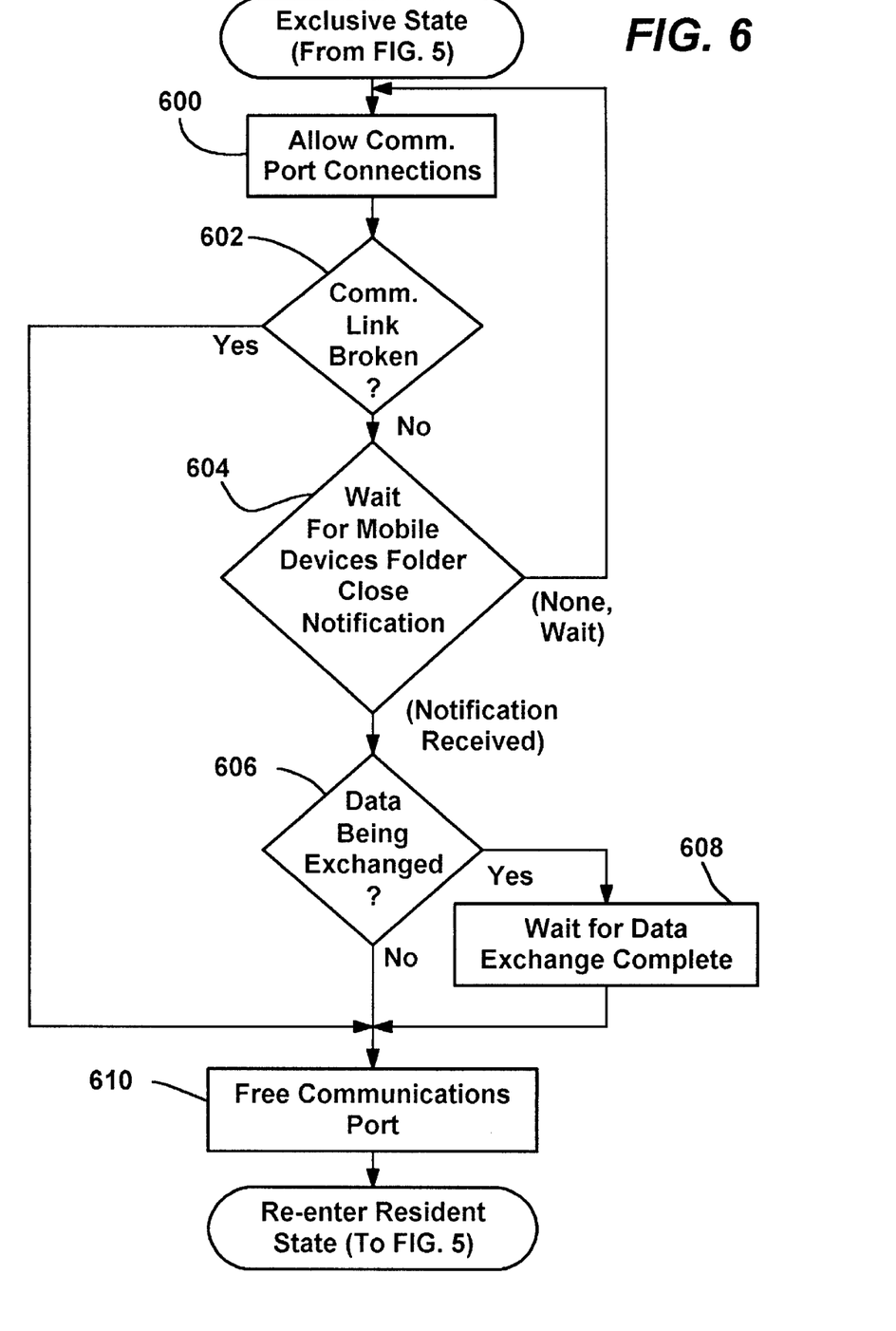

Turning now to an explanation of the operation of the invention with particular reference to the flow diagrams of FIGS. 4, 5 and 6, the overall process begins at Windows startup when the Windows Explorer/shell 35 is launched at step 400. The Windows CE services 72 is then automatically started at step 402, and network connections are allowed, i.e., the Windows CE services 72 begins in its resident state 76.

FIG. 5 logically represents the steps taken in the resident state, beginning at step 500 wherein it is shown that network connections are allowed. For example, a user may synchronize with a network device 70 at this time. Note that step 500 assumes that network connections are not otherwise prevented, e.g., no other application has exclusive control of the communications port 61 in a manner that prevents network communication. The extension 72 remains in this resident state, as shown via step 502, performing any desired functionality (other than communications port functionality) while essentially waiting for a user to open the Mobile Devices Folder 86. Note that a polling model may be employed to detect when the folder 86 is opened, however a notification model is preferably used. More particularly, at some time later, when a user uses the Windows Explorer/shell to open the Mobile Devices Folder 86, Windows CE Services 72 is notified. At this time, step 502 continues to step 504, wherein the extension 72 makes a request of the operating system 35 to open the communications port 61. If the port 61 is occupied, e.g., another application 74 has exclusive control thereof, the operating system 35 will fail the request, and step 506 will branch to step 508 wherein a suitable error message or the like will be provided to the user. Similarly, if another error prevents the communication port from being occupied, step 506 branches to step 508. Note that as shown in FIG. 3, the operating system 35 has access to the communications port state information and the like via communications port software 90, e.g., APIs, device drivers and the like. In any event, if the request fails, step 508 returns to step 500, and the extension 72 continues operating in the resident state, performing its functionality such as network functionality to the extent possible.

If instead the request to occupy the communications port (step 504) is successful, the shell extension 72 exclusively occupies the communications port and enters the exclusive state, shown by step 506 branching to step 510 and on to step 600 of FIG. 6. At this time, the communications port 61 is obtained exclusively for use by Windows CE Services 72, since by opening the Mobile Devices Folder 86 the user has indicated an interest in connecting to a Windows CE device 64. Step 600 represents the ability to communicate with the connected Windows CE device, such as the device 64.

In general, the communication port 61 is exclusively occupied until either the communications link is broken, e.g., the serial cable is unplugged, or the user closes the folder 86. This is represented by steps 602–604, which logically loop back to step 600 until a break in the link is detected or a folder close notification is received. Note that a break in the link (step 602) causes the CE Services 72 to branch to step 610 to free the communications port 61 and return to its resident state (FIG. 5) as described above.

Alternatively, when a user is no longer interested in the Mobile Devices Folder 86, the user will close that Windows Explorer. This causes a notification to be sent to the Windows CE Services 72, which is detected thereby at step 604. As represented by steps 606–608, the Windows CE Services 72 may delay transitioning to the resident state if data is still being exchanged after the Mobile Devices Folder window has been closed. This transition delay may, of course, time out or otherwise fail to ensure return to the resident state if the data exchange does not complete. In any event, once the communication is no longer needed or is no longer possible, the communications port 61 is freed for use by other applications at step 610, and the CE services 72 returns to its resident state (FIG. 5) as described above.

The benefits and advantages of the present invention may be understood in view of the following scenario. A user starts the computer, automatically loading the Windows Explorer and the Mobile Devices Folder extension 72 as described above. The Windows Explorer begins with no open windows on the desktop. At startup, in its resident state, Windows CE Services 72 is still able to receive network connections and allow synchronization, e.g., a user may connect a network card to a Windows CE hand-held personal computer and connect to the desktop computer to synchronize information.

At the same time, because the communications port is not occupied, the user may connect a digital camera 68 to the serial port 61, open corresponding digital camera software on the desktop computer 60 and transfer information. After closing the digital camera software and disconnecting the camera 68 from the communications port 61, the user may now connect a Windows CE hand-held PC by a serial cable and open the Mobile Devices Folder 86. Opening this folder 86 will cause the Windows Explorer to load the Mobile Devices Folder 86, and notify Windows CE Services 72 to start listening on the communications port 61. At this time, the communications port 61 is now occupied by Windows CE Services 72, and thus the digital camera software will not be able to connect on that same serial port 61, even if the Windows CE device is physically disconnected and camera is re-connected. However, upon closing the Mobile Devices Folder 86, the camera can be re-connected and used.

As can be readily appreciated, the present invention is extremely convenient with infrared ports, since physical connects or disconnects are not needed. Moreover, although the present invention does not free up the communications port when exclusively occupied by another, non-Windows CE communications application, non-Windows CE applications may be written to take advantage of the present invention. For example, in the future, other communications software (e.g., for a scanner) may include the resident and exclusive states of the present invention, such that the software operates in a resident state until some intuitive user action indicates that communication with its corresponding device is likely. At that time, the software enters the exclusive state, and returns to the resident state upon an indication that the port is no longer needed.

As can be seen from the foregoing detailed description, there is provided a method and system that enable the sharing of a communications port by a running program. The program intelligently detects when a user needs a communications port, and exclusively occupies it at that time, but at other times frees the port for use by other applications. While the port is free the program continues to run to provide functionality.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for selectively occupying a communications port of a computer system, comprising, loading a communications program, operating the communications program in a first state that provides functionality independent of the communications port while not occupying the communications port, detecting a user action related to a need to communicate through the communications port including receiving a notification that the user has opened a particular folder, and operating the communications program in a second state that occupies the communications port.

2. The method of claim 1 wherein loading a communications program comprises loading a shell extension.

3. The method of claim 1 wherein operating the communications program in a first state that provides functionality independent of the communications port includes performing network functionality via a network connection that is separate from the communications port while in the first state.

4. The method of claim 1 wherein the particular folder is related to device communication.

5. The method of claim 1 wherein the second state is entered upon the opening of the folder without requiring additional user input.

6. The method of claim 1 wherein entering the second state comprises, requesting to occupy the communications port, receiving information indicative of whether the communications port is occupied, and entering the second state if the information indicates the communications port is not occupied.

7. The method of claim 6 further comprising returning an error message if the information indicates the communications port is occupied.

8. The method of claim 1 further comprising communicating through the communications port while in the second state.

9. The method of claim 1 further comprising detecting a second user action indicative of the end of the need to communicate through the communications port, and entering the first state in response thereto, including freeing the communications port.

10. The method of claim 9 wherein detecting the second user action comprises receiving a notification that the user has closed a particular folder.

11. The method of claim 9 further comprising detecting continuing communication following detection of the second user action, and delaying entering the first state and freeing the communications port in response to detecting the continuing communication.

12. A computer-readable medium having computer-executable instructions for performing the method of claim 1.

13. A system for selectively occupying a communications port of a computer system, comprising, an input mechanism for detecting a user action related to communicating through the communications port, wherein the user action comprises the user opening a folder related to device communication, and a communications program having an exclusive state that exclusively occupies the communications port and a resident state that provides functionality independent of the communications port while not occupying the communications port, the communications program connected to obtain information from the input mechanism to enter the exclusive state when the user action is detected.

14. The system of claim 13 wherein the communications program comprises a shell extension.

15. The system of claim 13 further comprising a network card that is independent of the communications port for connecting the computer system to a network, and wherein the communications program includes network functionality by communicating via the network card while in the resident state.

16. The system of claim 13 wherein the input mechanism provides a notification to the communications program upon detecting the folder opening.

17. The system of claim 13 wherein the communications program is connected to an operating system, and wherein the communications program requests to occupy the communications port, receives information from the operating system indicative of whether the communications port is occupied, and enters the exclusive state if the information indicates the communications port is not occupied.

18. The system of claim 13 wherein the input mechanism further detects a second user action indicative of the end of the need to communicate through the communications port, and wherein the communication program reenters the resident state in response thereto, including freeing the communications port.

19. The system of claim 18 wherein the communication program reenters the resident state when the communication program receives a notification that the user has closed a particular folder.

20. In a computer system, a computer-implemented method comprising, loading a communications program, operating the communications program in a first state that provides functionality independent of a communications port of the computer system while not occupying the communications port, detecting a first user action related to a need to communicate through the communications port, requesting to occupy the communications port, receiving information indicative of whether the communications port is occupied, and, if the information indicates the communications port is not occupied, operating the communications program in a second state that occupies the communications port in response to the first user action, communicating with a device via the communications port, detecting a second user action indicative of the end of the need to communicate through the communications port, and entering the first state in response thereto, including freeing the communications port.

21. The method of claim 20 wherein loading a communications program comprises loading a shell extension.

22. The method of claim 20 wherein operating the communications program includes performing network functionality while in the first state.

23. The method of claim 20 further comprising occupying the communication port with another application while the communications program is in the first state.

24. A computer-readable medium having computer-executable instructions for performing the method of claim 20.

* * * * *

UNITED STATES PATENT AND TRADEMARK OFFICE
CERTIFICATE OF CORRECTION

PATENT NO.     : 6,240,472 B1  Page 1 of 1
DATED          : May 29, 2001
INVENTOR(S)    : Hu It is certified that error appears in the above-identified patent and that said Letters Patent is hereby corrected as shown below:

Column 4,
Line 61, "a "exclusive"" should read -- an "exclusive" --.
Line 63, "6 or 66" should read -- 64 or 66 --.

Column 9,
Lines 30 and 34, "reenters" should read -- re-enters --.

Signed and Sealed this

Fourteenth Day of December, 2004

JON W. DUDAS
*Director of the United States Patent and Trademark Office*